(12) United States Patent
Baldan

(10) Patent No.: US 12,258,037 B2
(45) Date of Patent: Mar. 25, 2025

(54) SYSTEMS AND METHODS FOR EFFICIENT VEHICLE EXTENT ESTIMATION

(71) Applicant: Motional AD LLC, Boston, MA (US)

(72) Inventor: Giancarlo Baldan, Boston, MA (US)

(73) Assignee: Motional AD LLC, Boston, MA (US)

( * ) Notice: Subject to any disclaimer, the term of this patent is extended or adjusted under 35 U.S.C. 154(b) by 384 days.

(21) Appl. No.: 17/804,522

(22) Filed: May 27, 2022

(65) Prior Publication Data
US 2023/0041031 A1    Feb. 9, 2023

Related U.S. Application Data

(60) Provisional application No. 63/229,370, filed on Aug. 4, 2021.

(51) Int. Cl.
*G06T 7/00* (2017.01)
*B60W 40/10* (2012.01)
*B60W 60/00* (2020.01)

(52) U.S. Cl.
CPC .......... *B60W 60/001* (2020.02); *B60W 40/10* (2013.01); *B60W 2420/403* (2013.01); *B60W 2420/408* (2024.01)

(58) Field of Classification Search
CPC ............... B60W 60/001; B60W 40/10; B60W 2420/403; B60W 2420/408; B60W 2530/201; G06T 7/70; G06T 7/10; G06T 17/00; G06T 2207/10028; G06T 2207/30236; G06T 2207/30252; G06T 2210/12; G06T 7/62; G06F 18/23211; G06V 10/25; G06V 20/58; G01S 17/06; G01S 17/86

See application file for complete search history.

(56) References Cited

U.S. PATENT DOCUMENTS

| | | | | |
|---|---|---|---|---|
| 6,976,237 | B1 * | 12/2005 | Teig | G06F 30/39 |
| | | | | 716/129 |
| 2020/0134372 | A1 * | 4/2020 | Roy Chowdhury | G05D 1/0221 |
| 2020/0265241 | A1 * | 8/2020 | Bruso | G06V 10/763 |
| 2020/0380704 | A1 * | 12/2020 | Yang | G06T 7/73 |
| 2020/0394444 | A1 * | 12/2020 | Yang | G06F 18/2323 |

(Continued)

FOREIGN PATENT DOCUMENTS

CN    113179135 A    7/2021

OTHER PUBLICATIONS

Chan, T., "Dynamic Planar Convex Hull Operations in Near-Logarithmic Amortized Time", Journal of the Association for Computing Machinery, Jan. 2001, vol. 48, p. 1-12.

(Continued)

*Primary Examiner* — Van D Huynh
(74) *Attorney, Agent, or Firm* — Knobbe, Martens, Olson & Bear, LLP

(57) ABSTRACT

Provided are methods for efficient vehicle extent estimation, which can include bounding box generation. Some methods described include determining bounding boxes surrounding detected point clusters according to tangents to convex hulls of the point clusters, and minimizing continuous functions of distances between points and bounding box sides. Accordingly, best-fit bounding boxes are determined more efficiently and quickly, as well as more accurately. Systems and computer program products are also provided.

20 Claims, 17 Drawing Sheets

(56) References Cited

U.S. PATENT DOCUMENTS

| | | | |
|---|---|---|---|
| 2021/0027075 A1* | 1/2021 | Lee | G06V 20/64 |
| 2021/0358184 A1* | 11/2021 | Molinari | B60W 30/09 |
| 2022/0012466 A1* | 1/2022 | Taghavi | G06F 18/2163 |
| 2022/0204029 A1* | 6/2022 | Chen | G01S 17/42 |
| 2022/0206162 A1* | 6/2022 | Chen | G08G 1/166 |
| 2024/0037976 A1* | 2/2024 | Zhang | G06T 7/60 |

OTHER PUBLICATIONS

Liu, J. et al., "Bounded Quadrant System: Error-bounded Trajectory Compression on the Go", 31st International Conference on Data Engineering, 2015, pp. 987-998.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Great Britain Office Action issued for Application No. GB 2211229.6, dated Aug. 23, 2022.

Great Britain Office Action issued for Application No. GB 2211229.6, dated Feb. 1, 2023.

* cited by examiner

SYSTEMS AND METHODS FOR EFFICIENT VEHICLE EXTENT ESTIMATION

BACKGROUND

Current vehicle extent estimation methods commonly employ remote sensing measurements, such as light detection and ranging (LiDAR) measurements, to estimate bounding boxes enclosing vehicle outer surfaces. Bounding box orientation estimation is typically accomplished via non-linear optimization methods and a grid search approach. These approaches have their drawbacks, though. A popular approach to shape fitting bounding boxes to measurement points involves minimizing the average distance of the points from sides of the bounding box, for each of a set of possible box orientations. The enclosing bounding box corresponding to the optimal orientation constitutes the fitted shape to the point cluster. This approach is computationally complex and slow, however, involving sorting all measurement points and re-computing their distances for every orientation.

DETAILED DESCRIPTION

Figure 1:
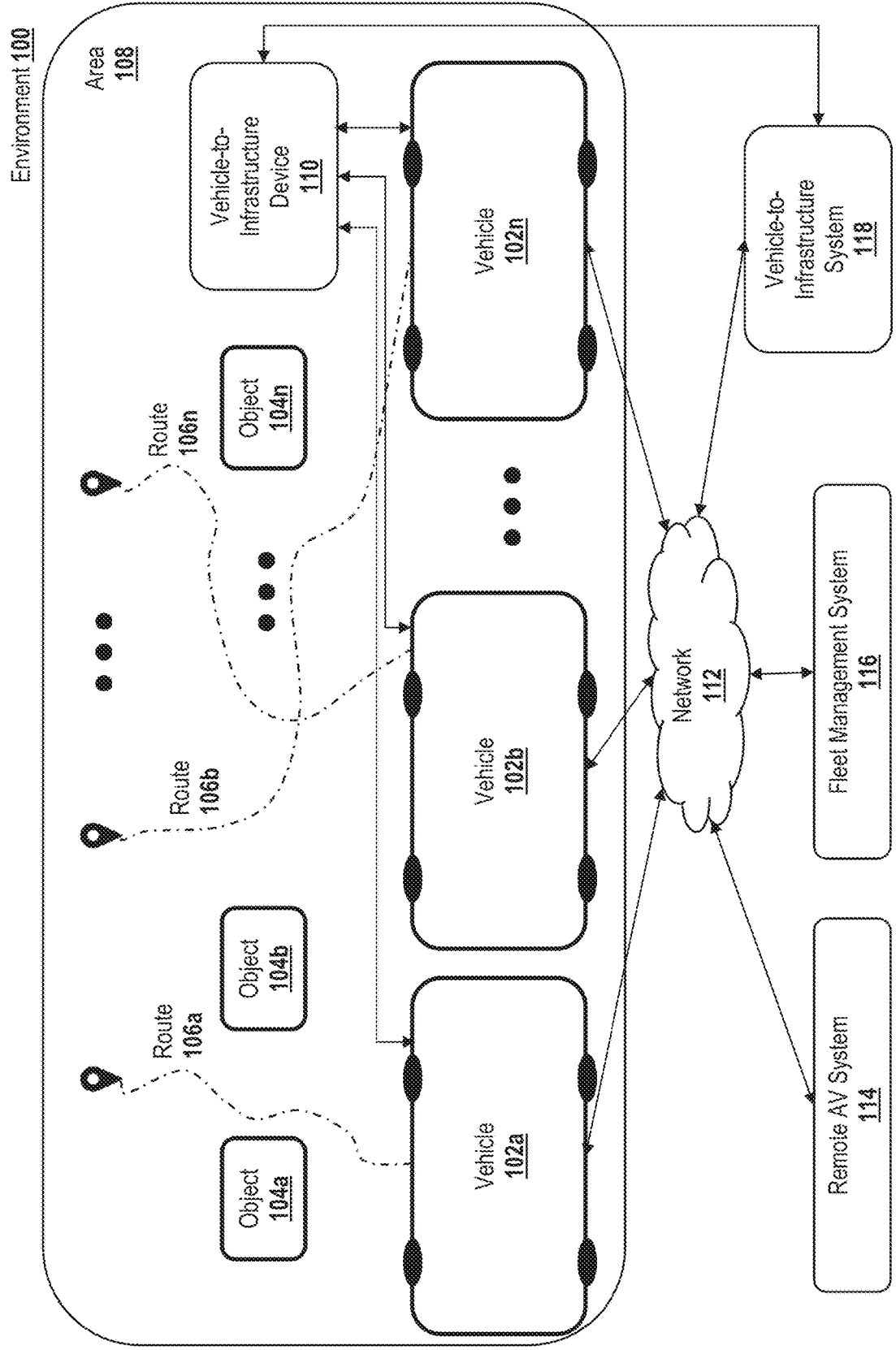
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships, or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit)

processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

In some aspects and/or embodiments, systems, methods, and computer program products described herein include and/or implement efficient vehicle extent estimation including bounding box generation. Convex hulls of measurement points are employed to identify bounding box orientations at which one or more points switch from being nearest to one side of the bounding box, to being nearest another side. Between these orientations, a candidate orientation is determined which yields a local minimum distance between the points and the sides of the bounding box. The orientation corresponding to the global minimum is selected from among these local minimum orientations, yielding the bounding box orientation that best fits the measurement points.

By virtue of the implementation of systems, methods, and computer program products described herein, techniques of embodiments of the disclosure accomplish more efficient vehicle extent estimation than is possible with prior systems and methods. Processes of embodiments of the disclosure allow for determination of bounding boxes from convex hulls rather than re-sorting and re-calculating point positions for each candidate bounding box orientation, and optimize candidate orientations in continuum, thus using fewer computational resources. Such processes also reduce loss of accuracy from downsampling, by leveraging all measurement points, thus yielding greater heading accuracy.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), a portion of a roadway, a roadside object, and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
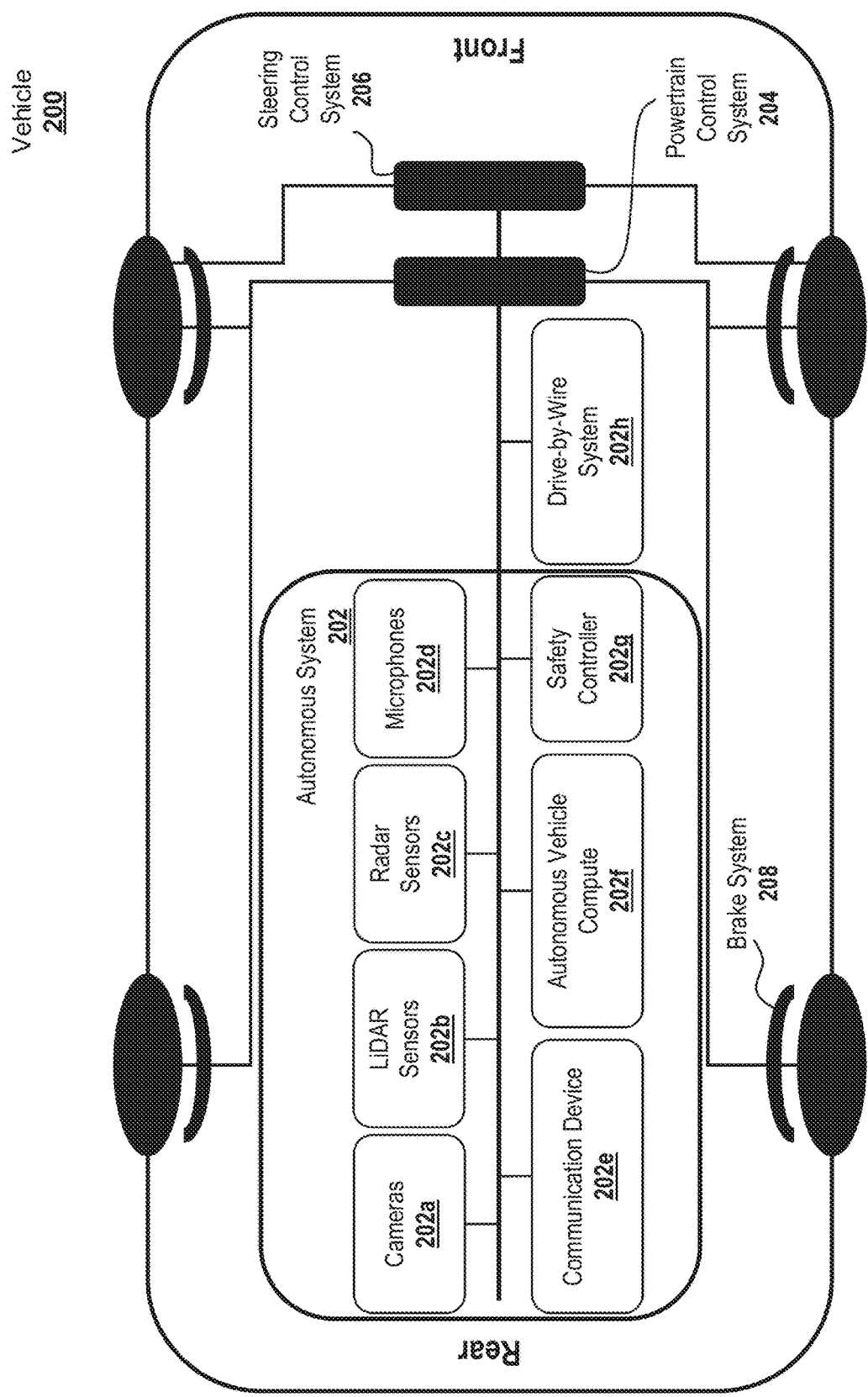
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
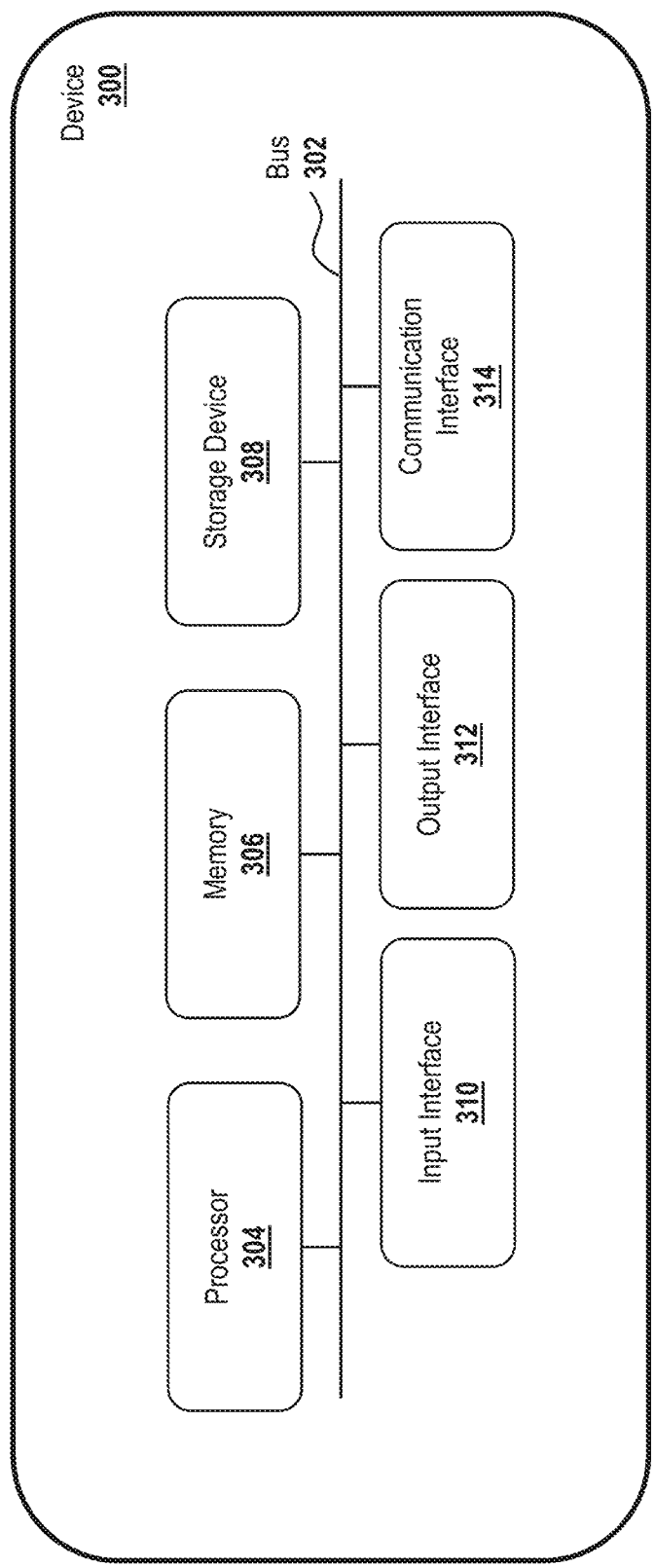
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

LiDAR sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f includes at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of vehicle 200 (e.g., at least one device of a system of vehicle 200), and/or one or more devices of network 112 (e.g., one or more devices of a system of network 112). In some embodiments, one or more devices of vehicles 102 (e.g., one or more devices of a system of vehicles 102), one or more devices of vehicle 200 (e.g., one or more devices of a system of vehicle 200), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
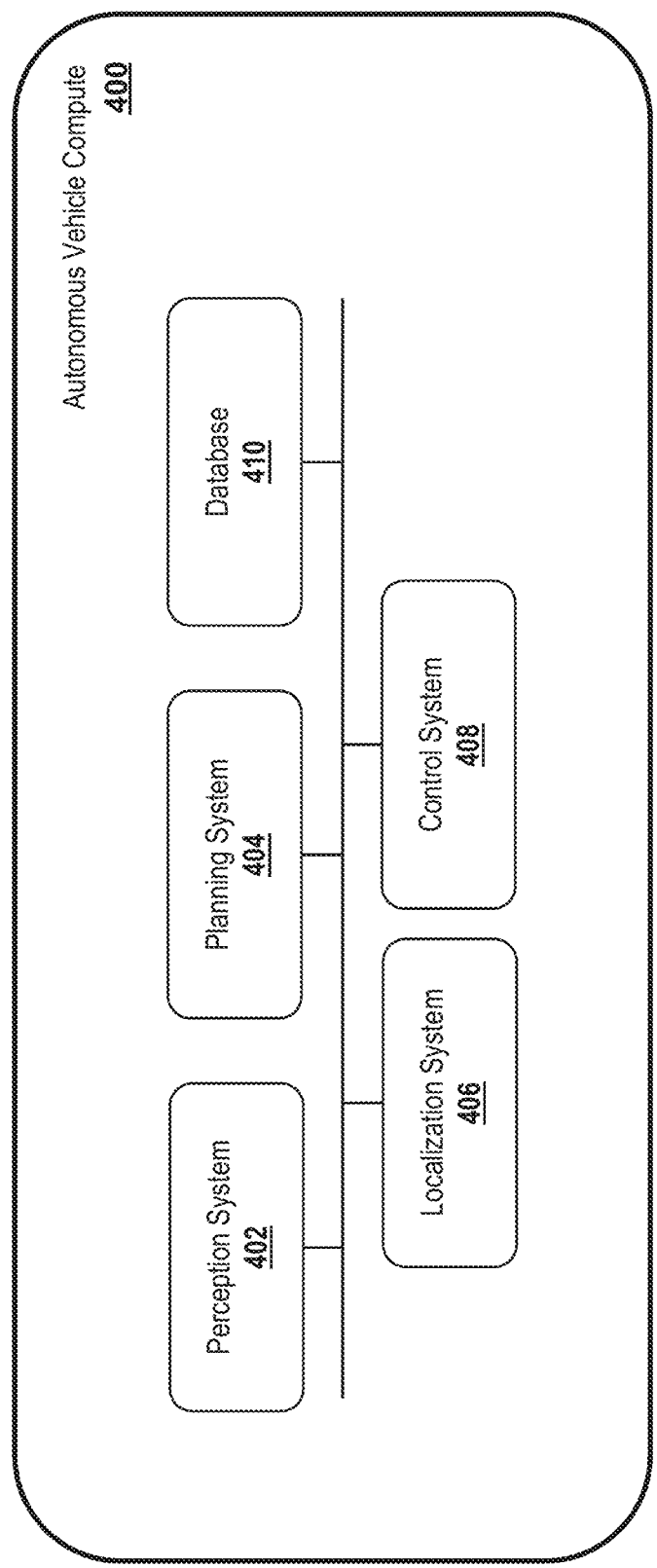
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
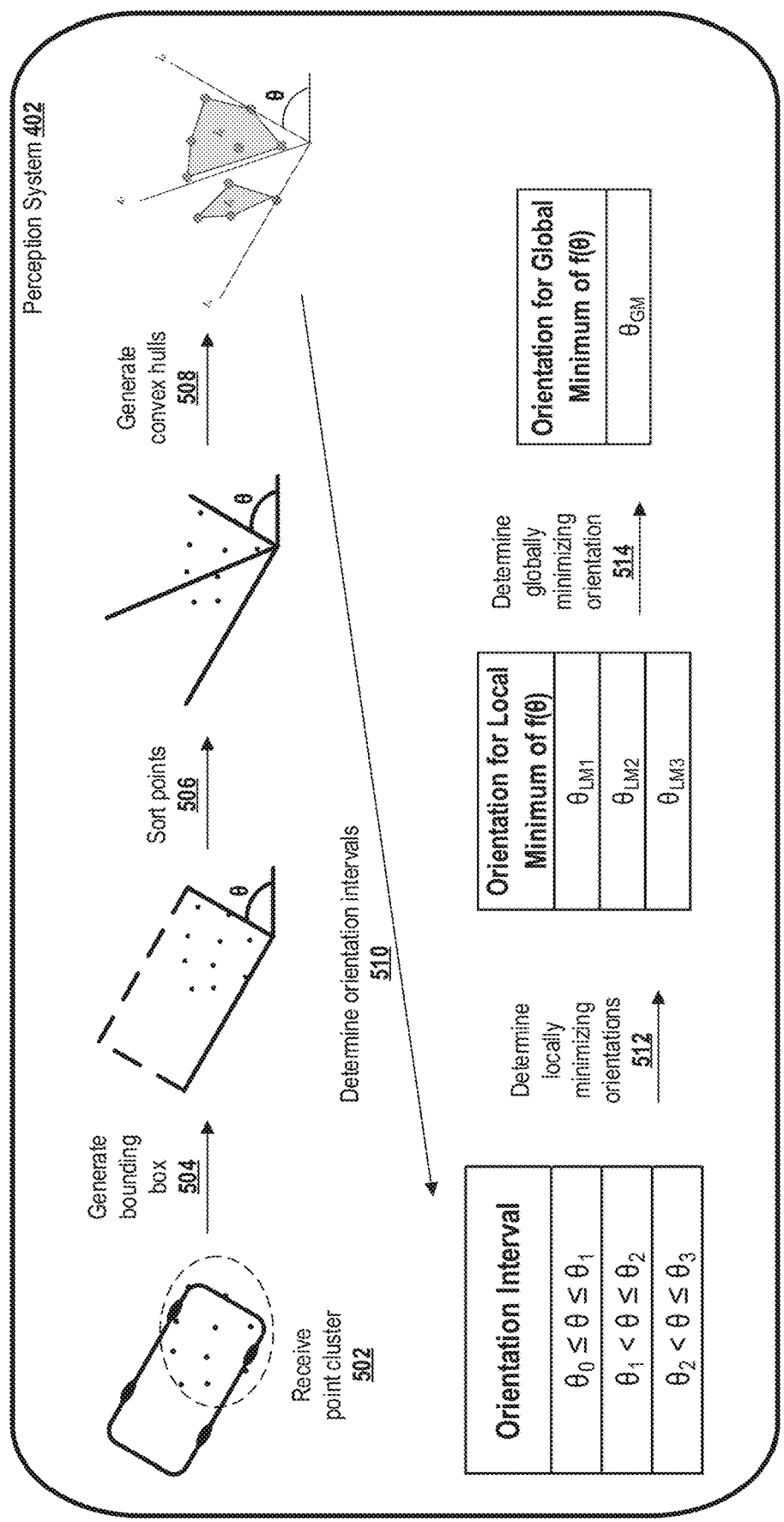
FIG. 5 is a diagram of an implementation of a process for efficient vehicle extent estimation.

Referring now to FIG. 5, illustrated is a diagram of an implementation 500 of a process for efficient vehicle extent estimation. In some embodiments, this implementation involves perception system 402. As shown in FIG. 5, perception system 402 may receive data associated with a point cluster 502 such as from LiDAR sensors 202b, representative of a nearby vehicle or other object 104n. Perception system 402 generates a corresponding bounding box 504, to surround point cluster 502. Perception system 402 then sorts the received points 506 into two groups, according to which bounding box side each point is nearest. Perception system 402 then generates the convex hull 508 for each of these groups, and determines the orientation θ intervals 510 for which the two sorted point groups remain constant. For example, perception system 402 sweeps through the different bounding box orientations to determine those orientation ranges for which every point remains closest to the same bounding box side. Those orientations $\theta_1, \theta_2, \theta_3, \ldots$, for which a point switches from being closest to one side to being closest to a different side, mark the end of one such interval and the beginning of the next, as shown in the leftmost table of FIG. 5. Perception system 402 then determines locally minimizing orientations 512, or orientations within each orientation interval at which the point cluster is at minimum average distance from their nearest bounding box sides. This produces a local minimum orientation $\theta_{LM1}$, $\theta_{LM2}, \theta_{LM3}, \ldots$, for each orientation interval. The globally minimizing orientation $\theta_{GM}$ is then selected 514 from among the local minimum orientations $\theta_{LM1}, \theta_{LM2}, \theta_{LM3}, \ldots$, and is simply the local minimum orientation $\theta_{LM1}, \theta_{LM2}$, $\theta_{LM3}, \ldots$ having the lowest average point distance. This orientation $\theta_{GM}$ is considered as the orientation of the best-fit bounding box, and a bounding box having this orientation $\theta_{GM}$ may accordingly be constructed to surround this point cluster.

Figure 6A:
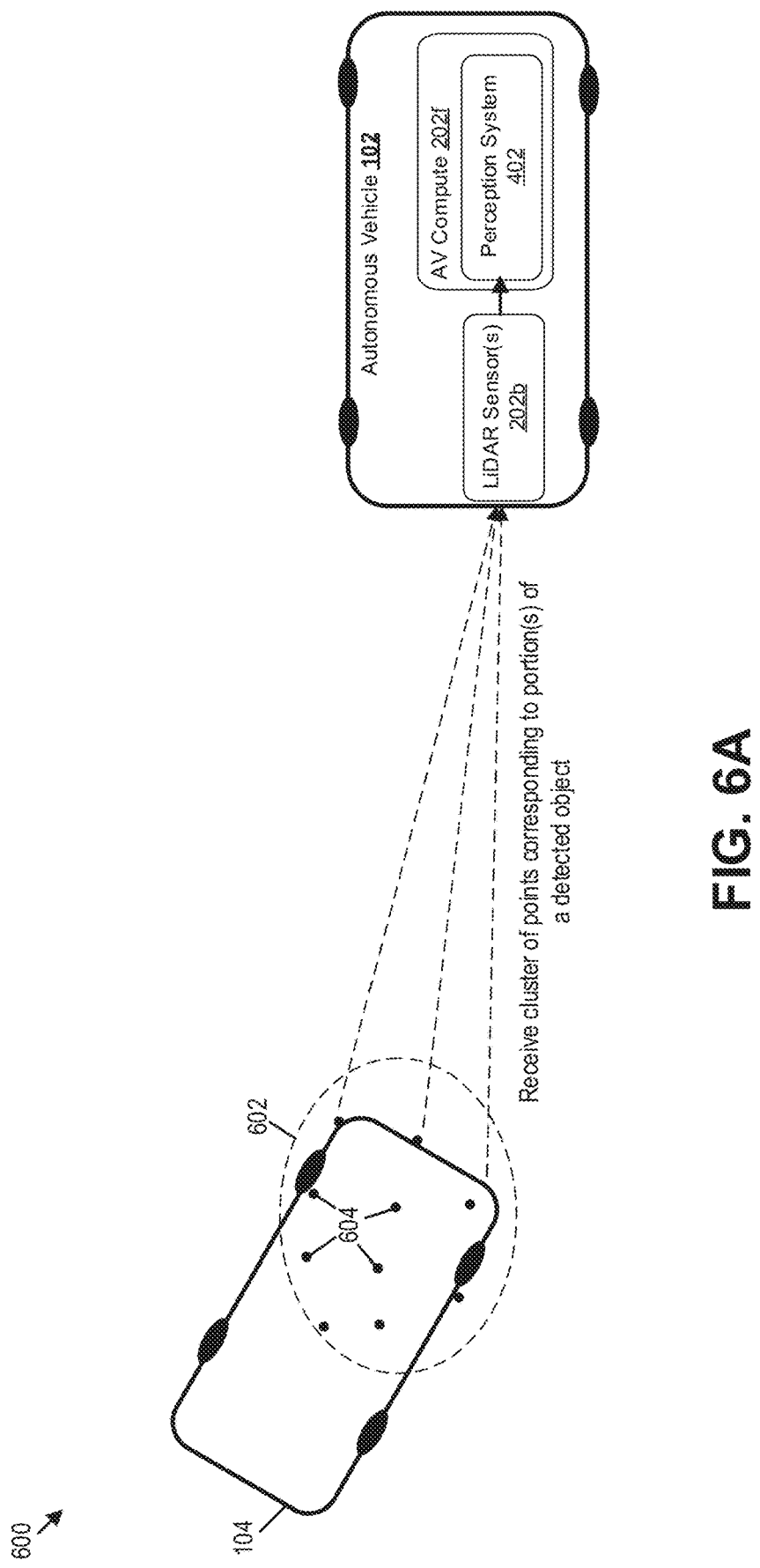
FIGS. 6A-6G are more detailed diagrams of an implementation of a process for efficient vehicle extent estimation.

FIGS. 6A-6G are diagrams illustrating the implementation of FIG. 5 in further detail. Referring now to FIG. 6A, an autonomous vehicle 102 may employ one or more LiDAR sensors 202b to detect discrete points 604 corresponding to location values of at least one detected portion of a nearby object such as a vehicle 104. The cluster of points 604 detected from vehicle 104 at a particular time interval may be referred to as a point cloud 602. The point cloud 602 is transmitted as data to be received by perception system 402. Points 604 may convey any desired position information. For example, points 604 may be any two-dimensional coordinates determined by any one or more sensors, and may be measured relative to a reference point or reference axis associated with a vehicle upon which the one or more sensors are placed, e.g., autonomous vehicle 102. Additionally, while the cluster of points 604 corresponding to one or more portion(s) of vehicle 104 is described here as being a cluster of LiDAR measurements, it is noted that the cluster of points 604 may include position information obtained from any source or combination of sources, such as radar measurements, location values determined from one or more images such as visible light or infrared images, ultrasound measurements from an ultrasonic sensor device (not separately shown in the figures), and/or the like.

Figure 6B:
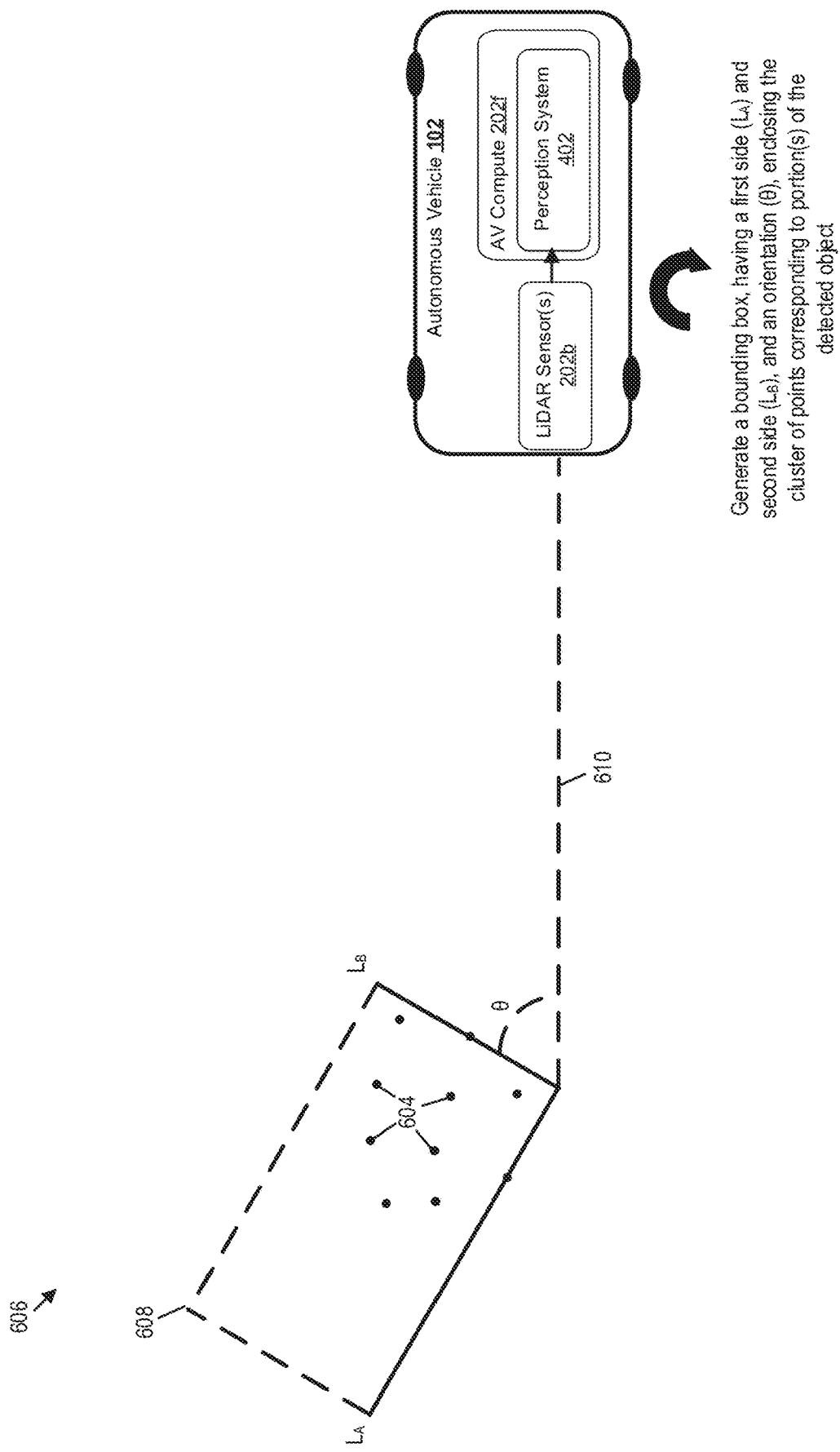

With reference to FIG. 6B, perception system 402 generates an initial bounding box surrounding the points 604 of point cloud 602. In particular, system 402 first generates a bounding box 608 with sides $L_A$ and $L_B$, oriented at an angle θ with respect to a coordinate frame. Angle θ, in various examples, is defined relative to any suitable coordinate frame, such as a coordinate frame that is associated with autonomous vehicle 102, for instance a coordinate frame based on reference 610, which may correspond to a central axis of autonomous vehicle 102. Here, angle θ may be selected arbitrarily from, e.g., $0° \leq \theta \leq 90°$, and $L_A$ and $L_B$ may be positioned to lie tangent to outer points 604. In this manner, an initial bounding box 608 is generated having dimensions and being oriented to surround each point 604.

It is noted that, while FIG. 6B illustrates generation of a bounding box, e.g., a rectangle, embodiments of the disclosure contemplate generation of any bounding shape that can enclose or substantially enclose any set of points. For example, the bounding enclosure generated may be a square, a rectangle, any polygon, or the like.

Figure 6C:
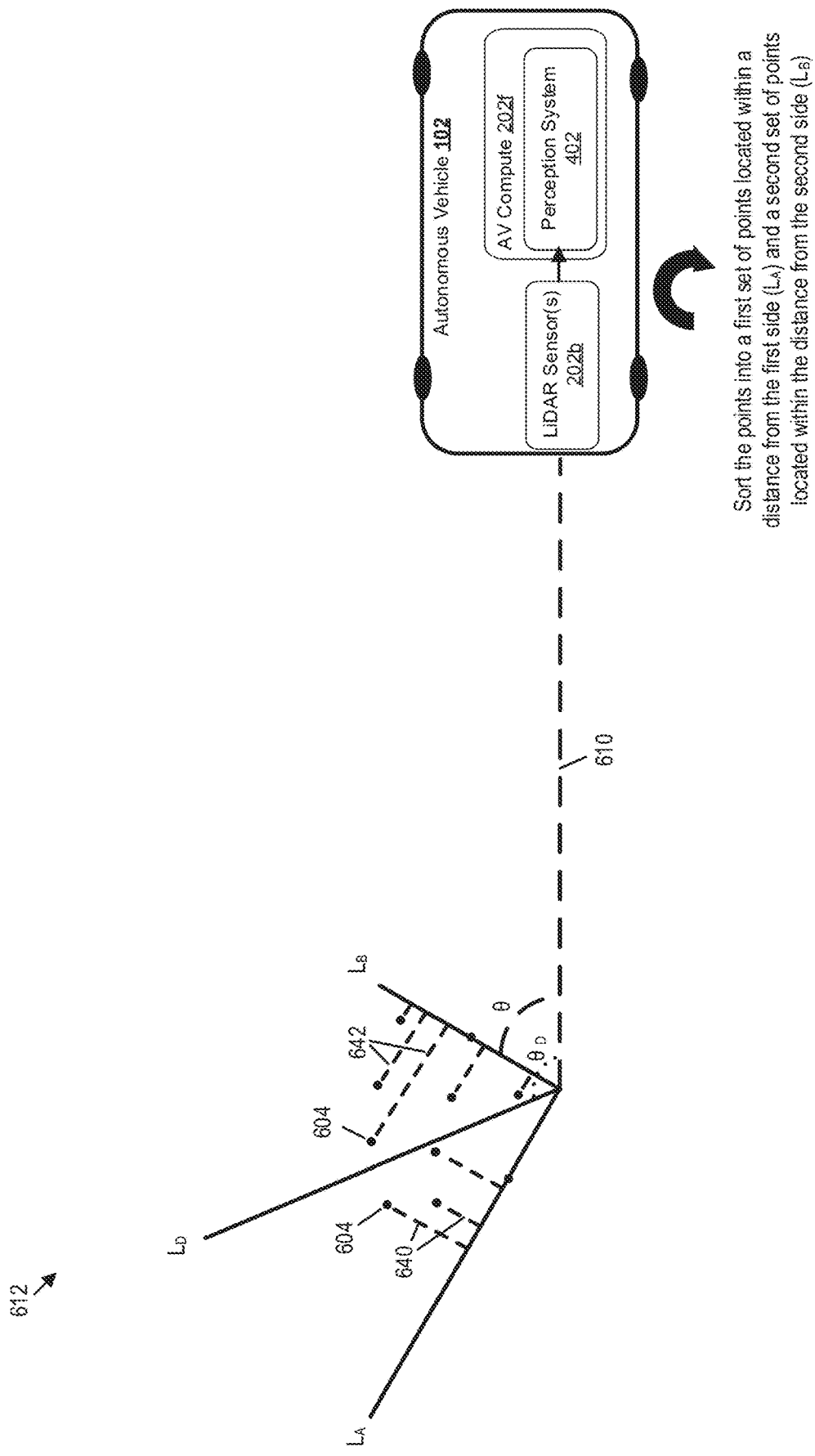

Referring to FIG. 6C, perception system 402 sorts the points 604 into two sets. One set contains those points 604 which lie closer to side $L_A$ than side $L_B$, and the other set contains those points 604 which lie closer to side $L_B$ than side $L_A$. For example, for a line $L_D$ that bisects the included angle between $L_A$ and $L_B$ and that forms an angle $\theta_D$ with respect to reference 610, perception system 402 sorts points 604 into one set lying to one side of line $L_D$, and another set lying to the other side of line $L_D$. In this manner, line $L_D$ may represent a threshold distance for use in sorting points into one or another of a first set or a second set (e.g. corresponding to convex hull $I_A$ or convex hull $I_B$, described below in connection with FIG. 6D).

Figure 6D:
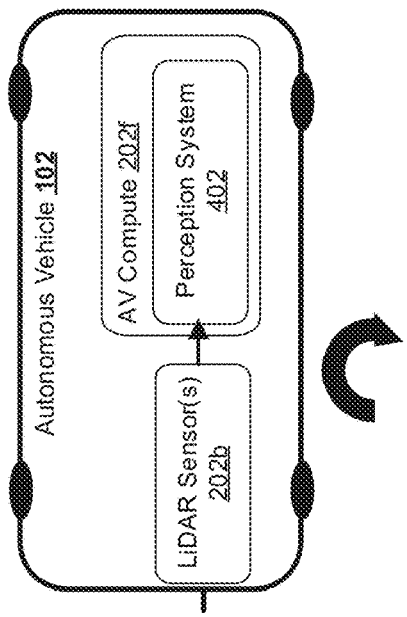
Figure 6D:
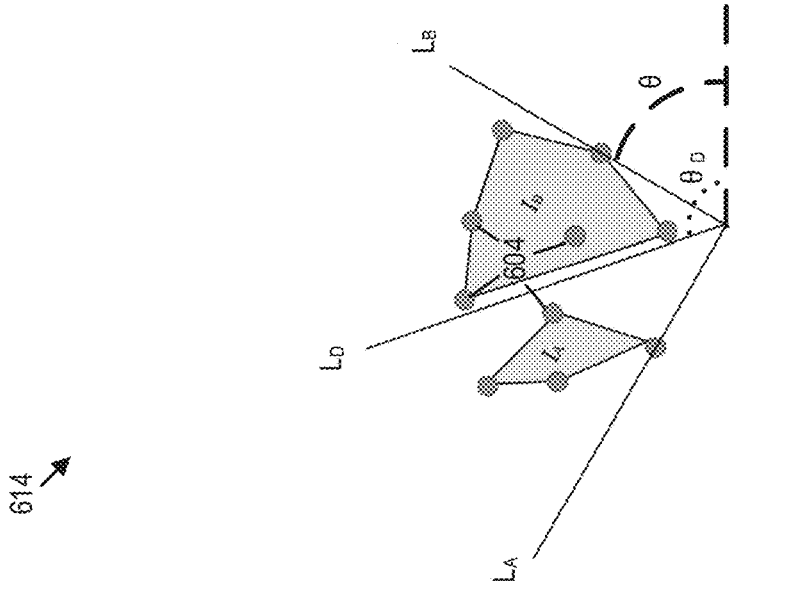

With reference to FIG. 6D, perception system 402 determines the convex hull of each of these sets of points 604. More specifically, system 402 determines the convex hull $I_A$ of the set of points 604 lying closer to side $L_A$ than side $L_B$, and the convex hull $I_B$ of the set of points 604 lying closer to side $L_B$ than side $L_A$.

Figure 6E:
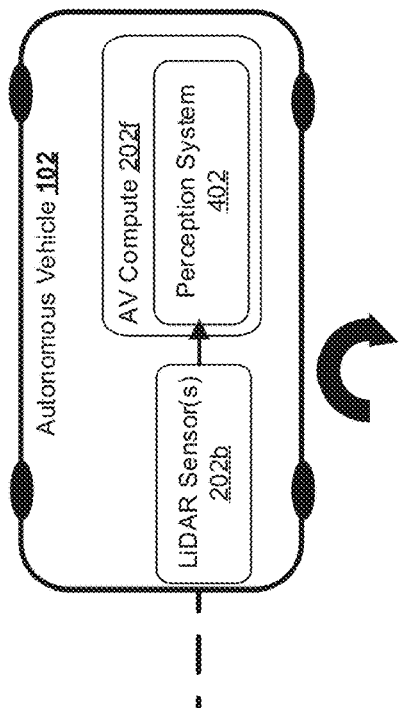
Figure 6E:
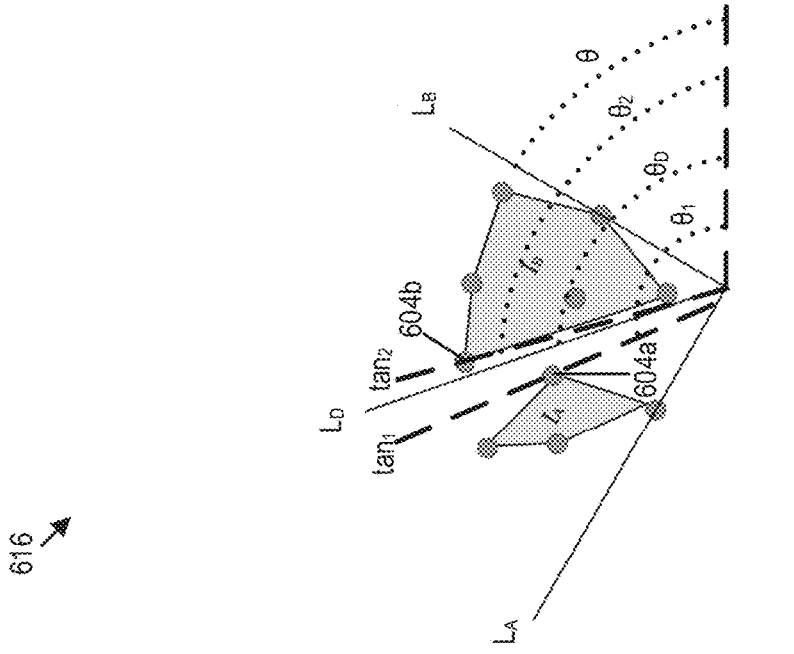

As shown in FIG. 6E, perception system 402 next rotates the bounding box sides $L_A$ and $L_B$ while maintaining tangency to the convex hulls $I_A$ and $I_B$, to determine intervals of orientations θ within which the two sets of points 604 remain constant. For example, bounding box sides $L_A$ and $L_B$ are rotated around convex hulls $I_A$ and $I_B$ while maintaining tangency to the convex hulls $I_A$ and $I_B$, to determine those orientations $\theta_1, \theta_2, \ldots$, or transition orientations, at which $L_D$ intersects a point 604. Intervals of orientations θ are thus the values of that lie between successive orientations $\theta_1, \theta_2$, etc. Accordingly, each orientation interval represents a range of θ for which no point 604 switches from being nearest one side $L_A, L_B$ to being nearest the other side $L_B, L_A$.

As described above, previous approaches to bounding box generation commonly involved sorting all measurement points and re-computing their distances for every orientation. For M possible orientations and n data points, this approach results in complexity of order Mn log(n). In contrast, embodiments of the disclosure avoid re-sorting measurement points and re-computing distances for each orientation, instead computing tangent lines to convex hulls (e.g., tangent line $tan_1$ of point 604a of convex hull $I_A$ forming an angle $\theta_1$ with respect to reference 610, and tangent line $tan_B$ of point 604b of convex hull $I_B$ forming an angle $\theta_2$ with respect to reference 610) and only switching one or more points between point sets at transitions between orientation intervals. As tangent line computations and convex hull updates may be performed in log(n) time for each sorted set of measurement points, approaches of embodiments of the disclosure only result in complexity of order n log(n), reducing computational overhead and processing time.

Figure 6F:
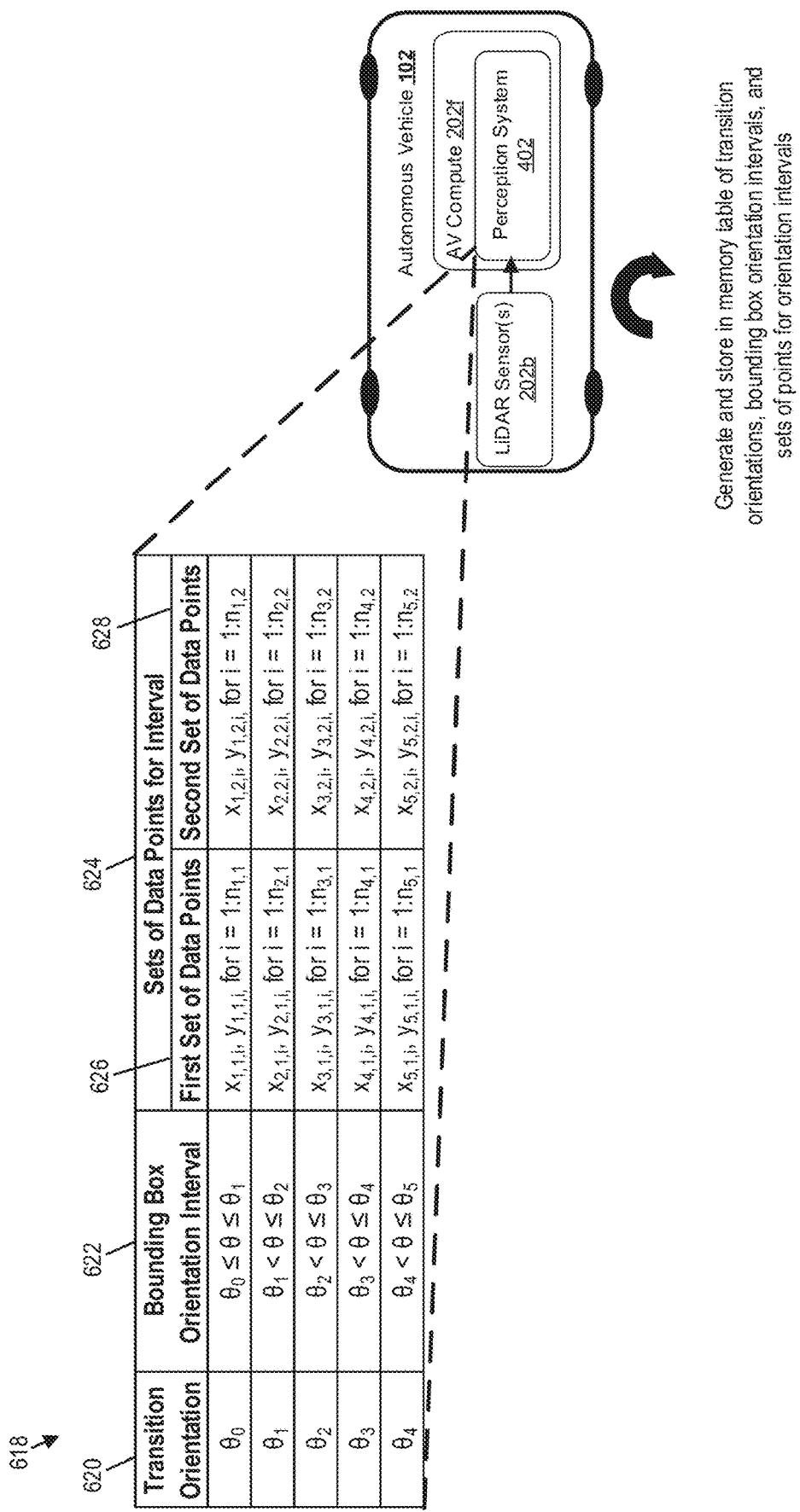

With reference to FIG. 6F, perception system 402 generates and stores, such as in memory 306, a table or other set of these transition orientations 620 ($\theta_1, \theta_2, \theta_3, \ldots$), corresponding bounding box orientation intervals 622, and the sets of data points for each interval 624. Each set of data points for an interval 624, in some embodiments, is based on points 604 and includes a first set of data points 626 corresponding to a first convex hull (e.g., convex hull $I_A$ of FIG. 6D) and a second set of data points 628 corresponding to a second convex hull (e.g., convex hull $I_B$ of FIG. 6D). The first set of data points 626, for example, may include for each data point an x and y coordinate, such as $x_{1,1,i}$ and $y_{1,1,i}$ for point index i=1 to where $n_{1,1}$ represents the number of data points in first set of data points 626 for the corresponding bounding box interval 622. The second set of data points 628, for example, may include for each data point an x and y coordinate, such as $x_{1,2,i}$ and $y_{1,2,i}$ for point index i=1 to $n_{1,2}$, where $n_{1,2}$ represents the number of data points in second set of data points 628 for the corresponding bounding box interval 622.

Figure 6G:
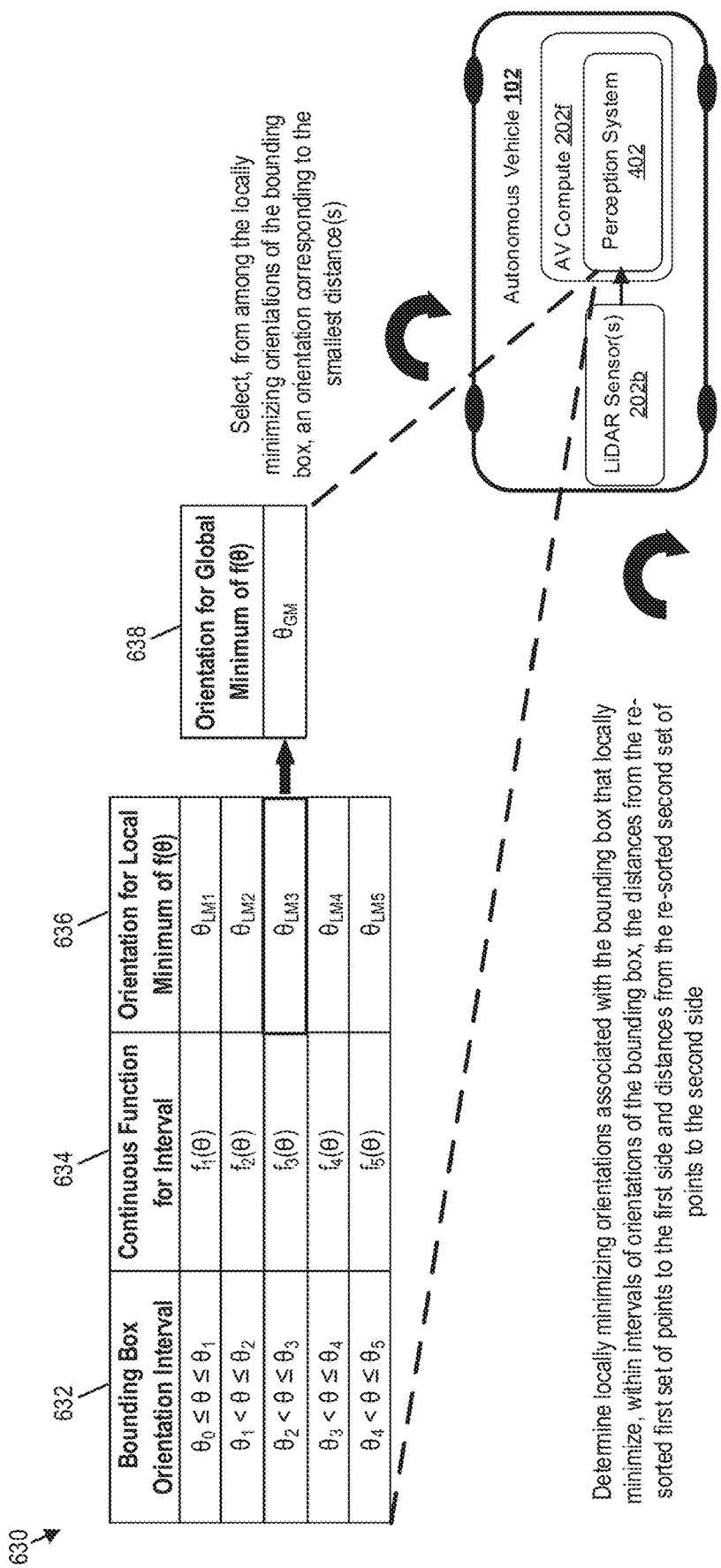

With reference to FIG. 6G, perception system 402 determines locally minimizing bounding box orientations θ for each interval (e.g., the orientation θ, within each orientation interval 632, for which distances from the first set of points 604 to the first side $L_A$ (e.g., distances 640 shown in FIG. 6C), and the distances from the second set of points 604 to the second side $L_B$ (e.g., distances 642 shown in FIG. 6C), are a minimum). In some embodiments of the disclosure, this is accomplished by determining a continuous function $f(θ)$ for the sum of point 604 distances to their respective sides $L_A$, $L_B$. The local minimum distance may then be determined as the minimum of $f(θ)$ within each orientation interval. Embodiments of the disclosure contemplate use of any metric, definition, or formulation for distance. As one example, the distances between points 604 and their bounding box sides $L_A$, $L_B$ may be defined as the L1 norm distance d, or Manhattan distance, which can be expressed, as shown in equation (1) below, as a trigonometric sum for a set of n data points:

$$\sum d(p_i) = \sum |ax_i + by_i + c| \qquad (1)$$
$$= \sum (ax_i + bx_i + c)$$
$$= a\sum x_i + b\sum y_i + nc$$
$$= aX + bY + nc$$
$$= X\cos(θ) - Y\sin(θ) + nc = f(θ),$$

where θ represents a bounding box orientation, and i represents a point index, $d(p_i)$ represents a distance from point i to its corresponding side (e.g., nearer side from among side $L_A$ and side $L_B$).

For a fixed set of points 604, X and Y are measures of the distances between points $p_i$ and corresponding sides $L_A$ and $L_B$, and thus remain constant. Accordingly, $f(θ)$ may be optimized in continuum, by setting its derivative to zero, e.g., $f'(θ)=0$. Thus, perception system 402 may determine each continuous function $f_1(θ)$, $f_2(θ)$, $f_3(θ)$, . . . , 634 for each interval of θ, from the above. Perception system 402 may then determine the orientation $θ_{LM1}$, $θ_{LM2}$, $θ_{LM3}$, . . . , of each local minimum of $f(θ)$ 636 for each interval, in continuum. The global minimum orientation 638 is then the $θ_{LM}$ value corresponding to the lowest $f(θ)$ value. In this manner, perception system 402 determines the best fit bounding box by determining the bounding box orientation resulting in the lowest overall distance, according to whatever distance metric is chosen. As $f(θ)$ is a continuous function, exact solutions for local and global minima of $f(θ)$ may be determined, resulting in greater accuracy in determining best-fit bounding boxes.

L1 distance is employed above as but one specific example, and embodiments of the disclosure contemplate use of any distance metric suitable for estimating a fit between points and a surrounding bounding enclosure. For instance, any other distance measurement, such as Euclidian distance or the like, may be employed in determination of an average distance between points 604 and bounding box sides $L_A$, $L_B$.

In some embodiments, as an alternative or in addition to minimizing $f(θ)$ as described above, perception system 402 minimizes an average distance $f\_avg(θ)$ of points 604 to bounding box sides $L_A$, $L_B$, as given by equation (2):

$$f\_avg(θ) = \frac{\sum_{L_A} d(p_i)}{N_{L_A}} + \frac{\sum_{L_B} d(p_i)}{N_{L_B}}, \qquad (2)$$

where $N_{L_A}$ represents a total number of points in a first set of points (e.g., set of points 626 in FIG. 6F, which may correspond to convex hull $I_A$ in FIG. 6E), and $N_{L_B}$ represents a total number of points in a second set of points (e.g., set of points 628 in FIG. 6F, which may correspond to convex hull $I_B$ in FIG. 6E). It may be observed that equation (2) may take the same form as equation (1), with differing values of X and Y.

Figure 7:
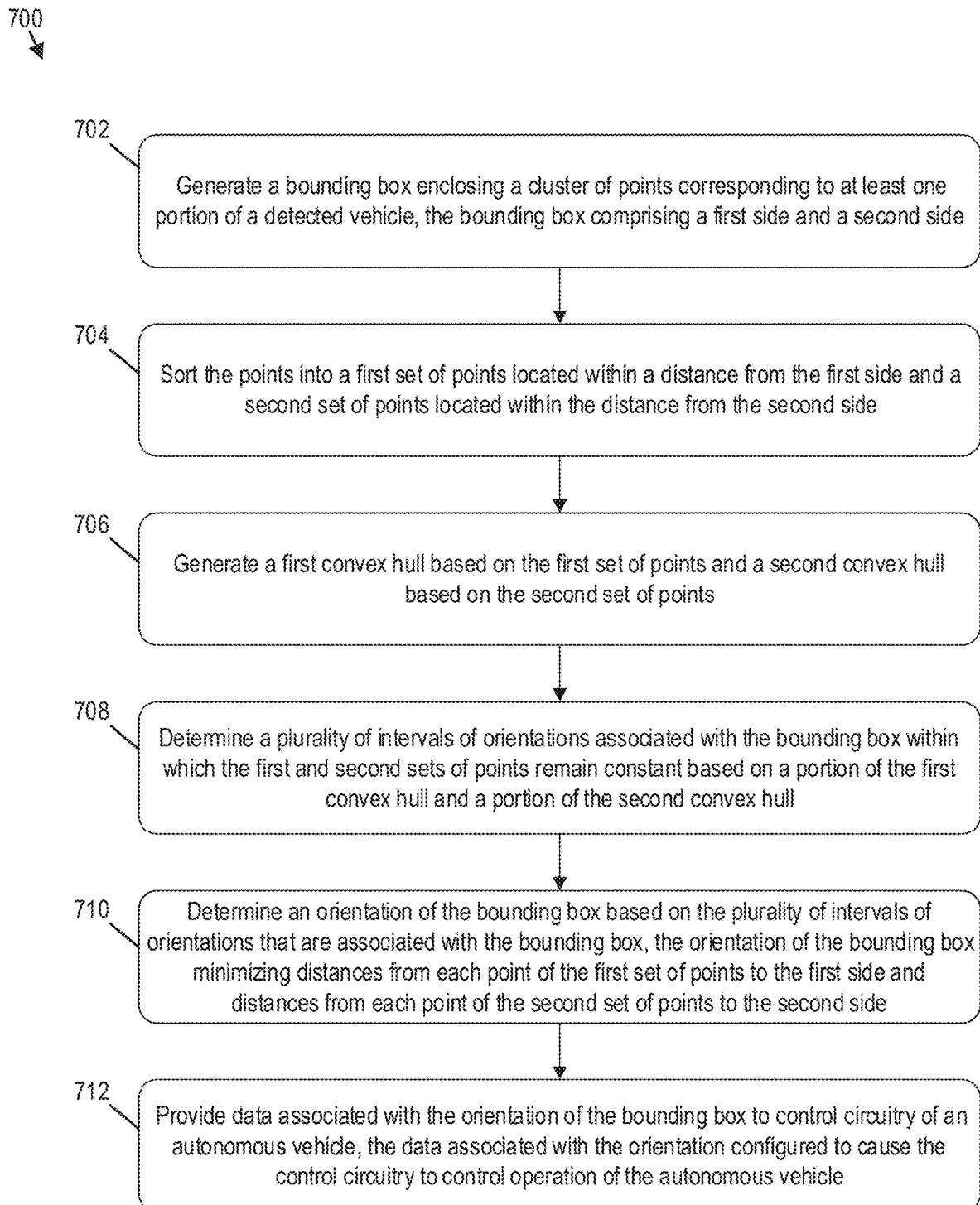
FIGS. 7-10 are flowcharts of processes for efficient vehicle extent estimation.

Referring now to FIG. 7, illustrated is a flowchart of a process 700 for efficient vehicle extent estimation. In some embodiments, one or more of the steps described with respect to process 700 are performed (e.g., completely, partially, and/or the like) by autonomous vehicle 102, as above. Additionally or alternatively, in some embodiments one or more steps described with respect to process 700 may be performed (e.g., completely, partially, and/or the like) by another device or group of devices separate from or including autonomous vehicle 102, such as a remote server (e.g., a remote server that is the same as or similar to remote AV system 114 and/or fleet management system 116 of FIG. 1) carrying out some or all of the above calculations.

With continued reference to FIG. 7, perception system 402 generates at least two sides of a bounding box enclosing a cluster of points corresponding to location values of at least a portion of a detected vehicle (block 702). In an example, perception system 402 generates sides $L_A$ and $L_B$ of a bounding box enclosing a cluster 602 of points 604, as shown in FIGS. 6A and 6B.

With continued reference to FIG. 7, perception system 402 sorts the points of the point cluster into a first set of points located within a distance (e.g., a threshold distance defined by line $L_D$ in FIG. 6C and/or FIG. 6D) from the first side of the bounding box, and a second set of points located within that distance from the second side (block 704), e.g., a set made up of points (e.g., points corresponding to convex hull $I_A$ in FIG. 6D) located closer to one side (e.g., side $L_A$ in FIG. 6D), and another set of points (e.g., points corresponding to convex hull $I_B$ in FIG. 6D) made up of points closer to the other side (e.g., side $L_B$ in FIG. 6D). Further details regarding an example sorting of points that may be performed at block 704 are provided above in connection with FIG. 6C and/or FIG. 6D.

With continued reference to FIG. 7, perception system 402 generates a first convex hull based on this first set of points, and a second convex hull based on the second set of points (block 706), as described above with reference to FIG. 6D. In an example, perception system 402 generates a first convex hull $I_A$ and a second convex hull $I_B$, as shown in FIG. 6D.

With continued reference to FIG. 7, perception system 402 determines a number of intervals of bounding box orientations within which the first and second sets of points remain constant based on a portion of the first convex hull and a portion of the second convex hull (block 708). In an example, with reference to FIG. 6E, perception system 402 determines tangents to the two convex hulls (e.g., $tan_1$ having tangent line angle $\theta_1$ with respect to reference 610 and tang having tangent line angle $\theta_2$ with respect to reference 610, as shown in FIG. 6E) for each orientation of the bounding box (e.g., ranging from an orientation of $\theta=0°$ to an orientation of $\theta=90°$ with respect to reference 610), and uses the tangents to determine intervals between which a point changes from one set to the other (e.g., from being closer to one bounding box side such as side $L_A$ to being closer to the other such as side $L_B$). The bounding box orientation intervals determined at block 708 are stored, for example, in a memory, such as memory 306 (e.g., as bounding box orientation intervals 622 of table 618 shown in FIG. 6F and/or as bounding box orientation intervals 632 of table 630 shown in FIG. 6G).

With continued reference to FIG. 7, perception system 402 determines, for the intervals determined at block 708, a bounding box orientation which minimizes distances from each point of the first set of points to the first side, and distances from each point of the second set of points to the second side (block 710). With reference to FIGS. 6F-6G, a continuous function can be determined for the sum of point distances within each interval. The local minima of these continuous functions for each interval thus indicates the best-fit orientation of each interval, and the best-fit orientation having the smallest distance is then the global minimum, or global best-fit orientation 638, or best-fit bounding box orientation.

With continued reference to FIG. 7, perception system 402 provides data of this best-fit bounding box to control circuitry of an autonomous vehicle such as vehicle 102, the data being configured to cause the control circuitry to control operation of the autonomous vehicle (block 712). For example, perception system 402 describes the best-fit bounding box to systems of the vehicle 102 for any desired purpose, such as assistance in navigation, or the like.

Figure 8:
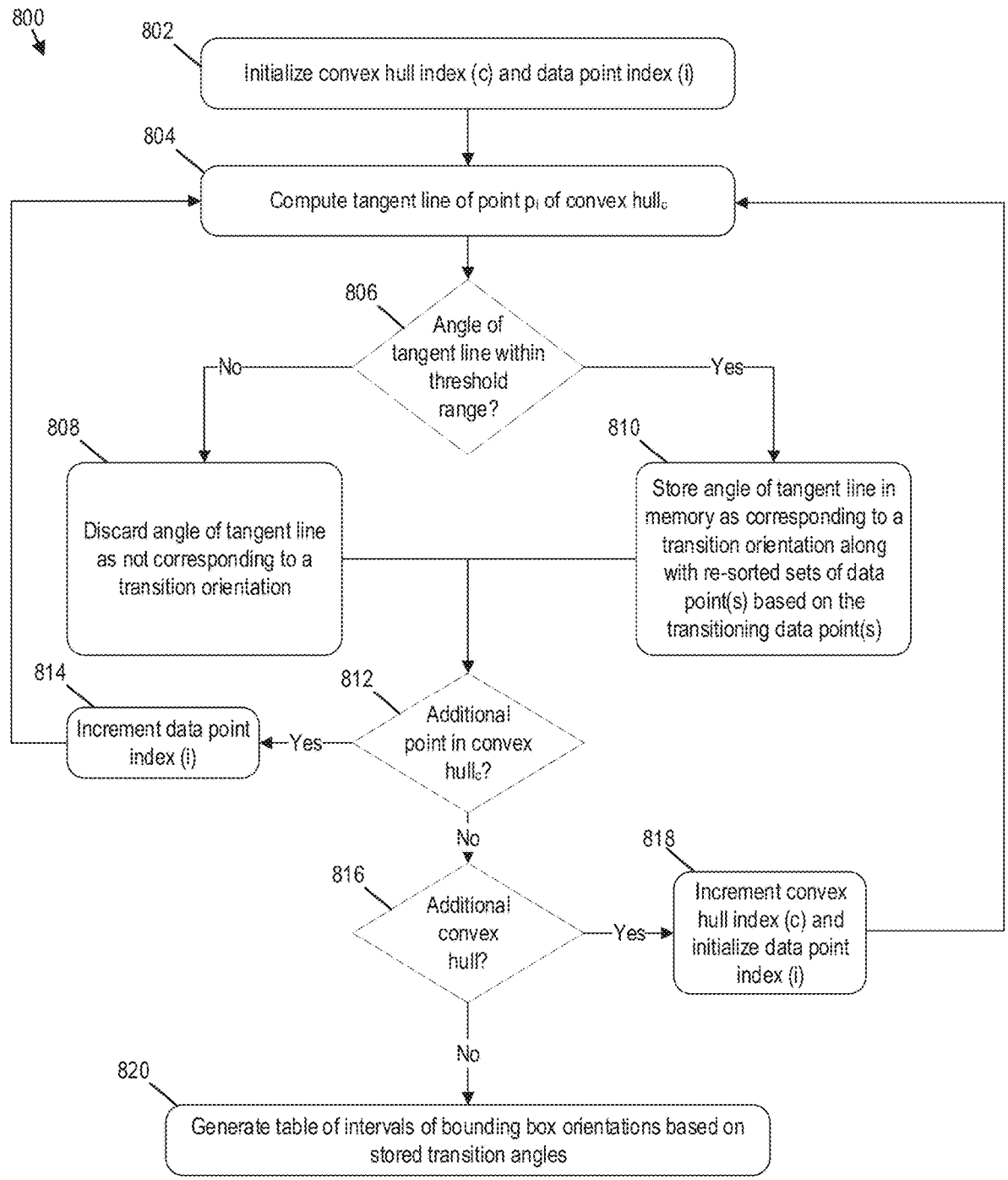

Referring now to FIG. 8, illustrated is a flowchart of a process 800, for determining intervals of bounding box orientations (e.g., bounding box orientation intervals 622 shown in table 618 of FIG. 6F and/or bounding box orientation intervals 632 shown in table 630 of FIG. 6G). In some embodiments, process 800 is the same as or similar to the process of block 708 described above in connection with FIG. 7. In some embodiments, one or more of the steps described with respect to process 800 are performed (e.g., completely, partially, and/or the like) by autonomous vehicle 102, as above. Additionally or alternatively, in some embodiments one or more steps described with respect to process 800 may be performed (e.g., completely, partially, and/or the like) by another device or group of devices separate from or including autonomous vehicle 102, such as a remote server carrying out some or all of the above calculations. It is noted that process 800 allows for updating of convex hulls without increasing complexity. As described herein, tangents to convex hulls are employed to determine bounding box orientation intervals 632. Those tangents that define endpoints of orientation intervals also intersect points that switch convex hulls, leading to updates thereto. Editing of point sets and determination of corresponding convex hulls may then be determined in any manner, such as according to processes described in Timothy Chan, *Dynamic Planar Convex Hull Operations in Near-Logarithmic Amortized Time,* 48 J. ACM 1 (2001), which is hereby incorporated by reference in its entirety, With continued reference to FIG. 8, prior to execution of block 802, perception system 402 generates an initial bounding box and sort points 604 into two sets according to which leg $L_A$, $L_B$ of the bounding box is closer, as illustrated in FIG. 6C and as described in connection with blocks 702, 704, 706 of FIG. 7 above. Perception system 402 subsequently determines the convex hull for each set of points 604 (as illustrated in FIG. 6D), then initializes a convex hull index c for each convex hull, and point index i (block 802).

With continued reference to FIG. 8, perception system 402 computes a tangent line of a point $p_i$ of a convex hull c (block 804). In an example, with reference to FIG. 6E, perception system 402 computes a tangent line $tan_1$ of point 604a forming a tangent line angle $\theta_1$ with respect to reference 610.

With continued reference to FIG. 8, perception system 402 determines whether the tangent line angle formed by the tangent line computed for point $p_i$ of convex hull c at block 804 lies within a threshold range (block 806). For example, perception system 402 may determine whether tangent line angle $\theta_1$ is near angle $\theta_D$ of line $L_D$ to within a threshold degree of nearness, to determine whether tangent line angle $\theta_1$ corresponds to a transition orientation (e.g., a bounding box orientation at which point $p_i$ is expected to cross over line $L_D$ and switch from being closer to line $L_A$ to being closer to line $L_B$).

With continued reference to FIG. 8, if perception system 402 determines at block 806 that the tangent line does not lie within a threshold range ("No" at block 806), then perception system 402 discards the angle of that tangent line as not corresponding to a transition orientation (block 808).

With continued reference to FIG. 8, if perception system 402 determines at block 806 that the tangent line lies within a threshold range ("Yes" at block 806), then perception system 402 stores the angle of that tangent line in a memory, such as memory 306, to correspond to a transition orientation, along with the corresponding re-sorted sets of points 604 (block 810), accounting for this newly-determined transition point.

With continued reference to FIG. 8, after block 808 or block 810, as the case may be, perception system 402 determines whether convex hull c includes another point for which a tangent line is to be computed (block 812). In an example, perception system 402 keeps track of each point of convex hull c and performs the determination at block 812 by sequentially stepping through each point of convex hull c.

With continued reference to FIG. 8, if perception system 402 determines that convex hull c includes another point for which a tangent line is to be computed ("Yes" at block 812), then perception system 402 selects the other point on convex hull c and increments the data point index i (block 814) and passes control to block 804 to repeat the processes described above for blocks 804, 806, 808, and/or 810 to determine another transition orientation, if it exists.

With continued reference to FIG. 8, if perception system 402 determines that convex hull c does not include another point for which a tangent line is to be computed ("No" at block 812), then perception system 402 determines (block 816) whether another convex hull (e.g., one of the convex hulls generated at block 706 of FIG. 7) has not yet been analyzed to determine tangent line angles and/or transition orientations according to the processes described above for blocks 802, 804, 806, 808, 810, 812, and/or 814.

With continued reference to FIG. 8, if perception system 402 determines that another convex hull (e.g., one of the convex hulls generated at block 706 of FIG. 7) remains to be analyzed to determine tangent line angles and/or transition orientations according to the processes described above for blocks 802, 804, 806, 808, 810, 812, and/or 814 ("Yes" at block 816), perception system 402 increments the convex hull index c to correspond to the other convex hull to be analyzed, initializes data point index i, and passes control to block 804 to repeat the processes described above for blocks 804, 806, 808, and/or 810 to determine the transition orientations for the other convex hull (block 818).

With continued reference to FIG. 8, if perception system 402 determines that no other convex hull (e.g., one of the convex hulls generated at block 706 of FIG. 7) remains to be analyzed to determine tangent line angles and/or transition orientations according to the processes described above for blocks 802, 804, 806, 808, 810, 812, and/or 814 ("No" at block 816), e.g., if both convex hulls generated at block 706 of FIG. 7 have been analyzed, perception system 402 generates (block 816) a table of intervals of bounding box orientations based on the transition angles (e.g., table 618 of FIG. 6F) that were stored over multiple iterations of the process of block 810 (block 820).

Figure 9:
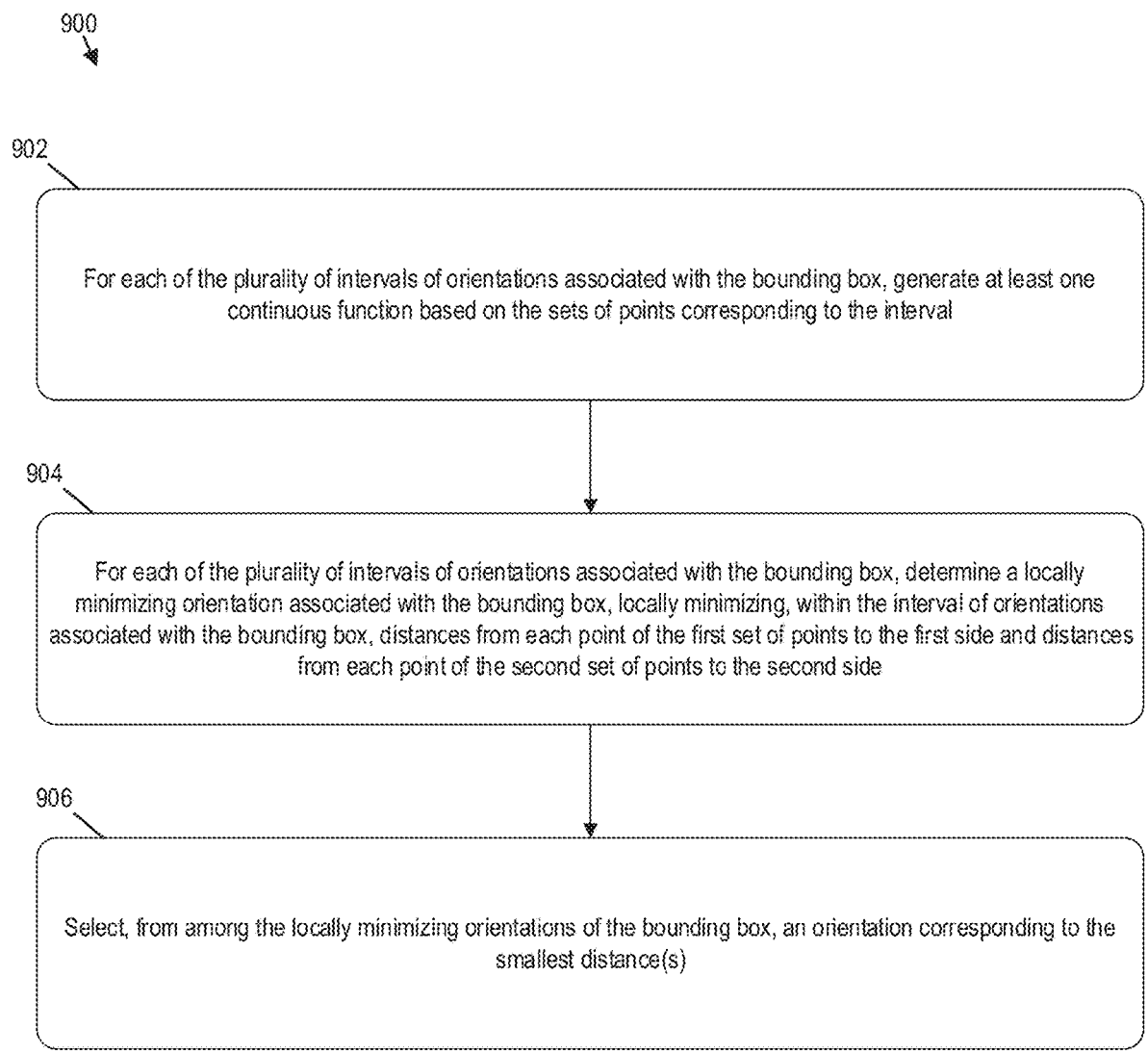

Referring now to FIG. 9, illustrated is a flowchart of a process 900, for determining an orientation of a bounding box that constitutes a best fit for a vehicle extent estimation. In some embodiments, the best fit bounding box orientation is determined as the bounding box orientation (e.g., θ of FIG. 6D) that minimizes (i) the distances (e.g. shortest distances) from points of a first convex hull (e.g., points 604 of convex hull $I_A$ of FIG. 6D) to a first side of the bounding box (e.g., side $L_A$ of FIG. 6D) and (ii) the distances (e.g., shortest distances) from points of a second convex hull (e.g., points 604 of convex hull $I_B$ of FIG. 6D) to a second side of the bounding box (e.g., side $L_B$ of FIG. 6D). In some embodiments, process 900 is the same as or similar to the process of block 710 described above in connection with FIG. 7. In some embodiments, one or more of the steps described with respect to process 900 are performed (e.g., completely, partially, and/or the like) by autonomous vehicle 102, as above. Additionally or alternatively, in some embodiments one or more steps described with respect to process 900 may be performed (e.g., completely, partially, and/or the like) by another device or group of devices separate from or including autonomous vehicle 102, such as a remote server (e.g., a remote server that is the same as or similar to remote AV system 114 and/or fleet management system 116 of FIG. 1) carrying out some or all of the above calculations.

With continued reference to FIG. 9, prior to execution of block 902, perception system 402 determines bounding box orientation intervals (e.g., bounding box orientation intervals 622 shown in table 618 of FIG. 6F and/or bounding box orientation intervals 632 shown in table 630 of FIG. 6G) within which the sets of points sorted into convex hulls remain constant, in the manner described above in connection with blocks 702, 704, 706, and 708 of FIG. 7. For example, with reference to FIG. 6D, perception system 402 determines each interval of bounding box orientations (e.g., θ of FIG. 6D) for which (i) the points 604 of convex hull $I_A$ remain sorted into convex hull $I_A$ because the points 604 remain closer to bounding box side $L_A$ than to bounding box side $L_B$ (e.g., the points 604 remain on a same side of diagonal line $L_D$ that bisects the angle between line $L_A$ and line $L_B$) throughout the particular interval of bounding box orientations and (ii) the points 604 of convex hull $I_B$ remain sorted into convex hull $I_B$ because the points 604 remain closer to bounding box side $L_B$ than to bounding box side $L_A$ (e.g., they remain on a same side of diagonal line $L_D$ that bisects the angle between line $L_A$ and line $L_B$) throughout the particular interval of bounding box orientations.

With continued reference to FIG. 9, perception system 402 generates a continuous function $f(\theta)$ for each bounding box orientation interval (e.g., each bounding box orientation interval represented in the table generated at block 820 of FIG. 8), based on the re-sorted point sets and describing the distance (as defined by any suitable metric) between the points of each set and the bounding box sides (block 902).

With continued reference to FIG. 9, perception system 402 determines, for each orientation interval, a locally minimizing orientation associated with the bounding box, the local minimizing orientation being an orientation at which the distance function $f(\theta)$ reaches a minimum within that interval (block 904), including at its extremes. As above, this may be accomplished by setting $f(\theta)=0$ for each interval and solving the resulting equation in known manner. The result is a bounding box orientation corresponding to a local minimum distance of points 604 in each set to their respective bounding box sides.

With continued reference to FIG. 9, perception system 402 selects, from the local minimum orientations determined at block 904, the orientation corresponding to the smallest such distance (block 906), which is deemed the bounding box that best fits the points 604.

Figure 10:
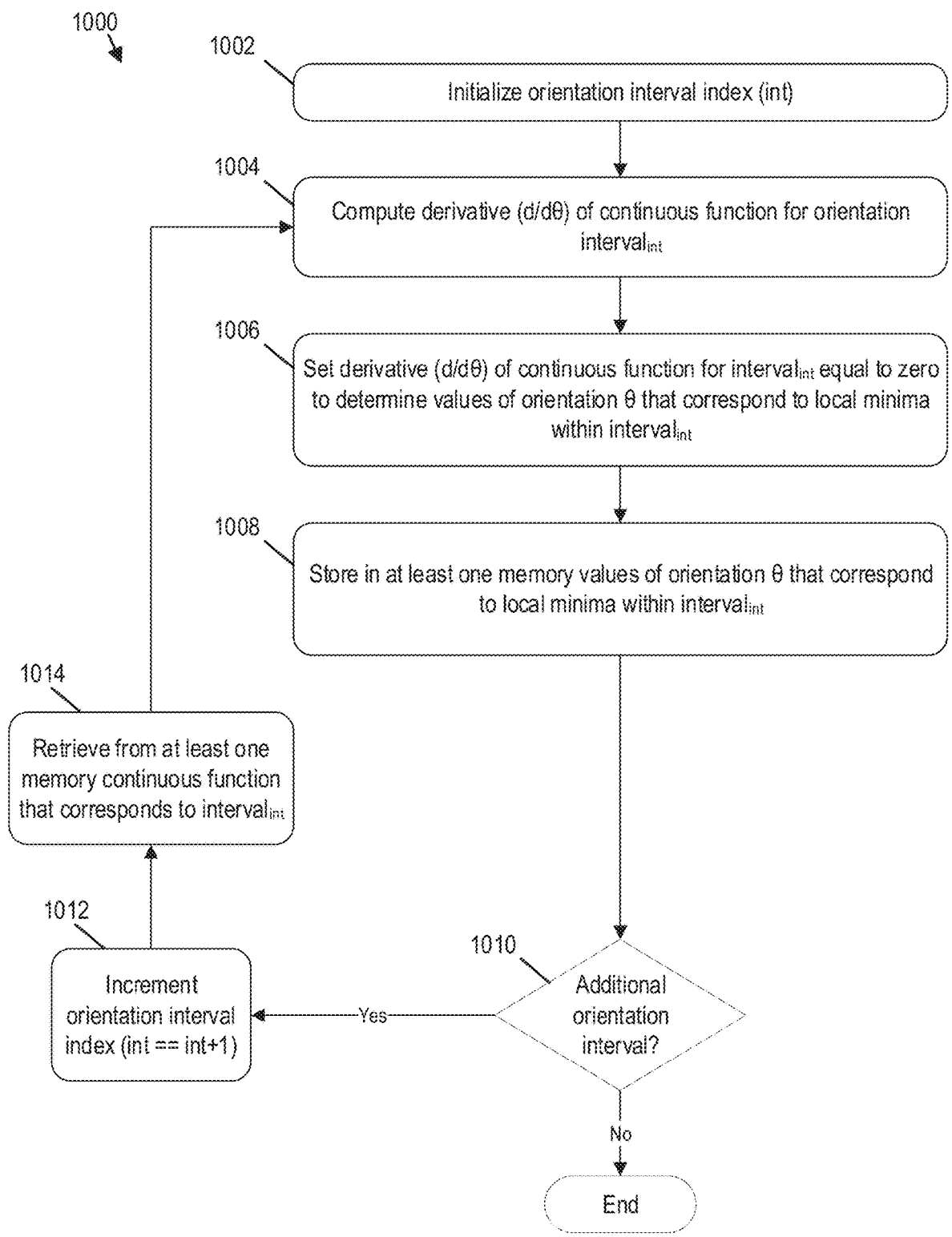

Referring now to FIG. 10, illustrated is a flowchart of a process 1000 for determining a locally minimizing bounding box orientation that locally minimizes, within a particular bounding box orientation interval: (i) distances from points of a first convex hull to a first side of the bounding box (e.g., distances 640 from points 604 of convex hull $I_A$ to side $L_A$) and (ii) distances from points of a second convex hull to a second side of the bounding box (e.g., distances 642 from points 604 of hull $I_B$ to side $L_B$). In some embodiments, process 1000 is the same as or similar to the process of block 904 described above in connection with FIG. 9. In some embodiments, one or more of the steps described with respect to process 1000 are performed (e.g., completely, partially, and/or the like) by autonomous vehicle 102, as above. Additionally or alternatively, in some embodiments one or more steps described with respect to process 1000 may be performed (e.g., completely, partially, and/or the like) by another device or group of devices separate from or including autonomous vehicle 102, such as a remote server (e.g., a remote server that is the same as or similar to remote AV system 114 and/or fleet management system 116 of FIG. 1) carrying out some or all of the above calculations.

With continued reference to FIG. 10, prior to execution of block 1002, perception system 402 generates a continuous function $f(\theta)$ for a bounding box interval that is based on sets of points of convex hulls and that describes the distance (as defined by any suitable metric) between the points of each set and a nearby bounding box side (e.g., as described above in connection with block 902 of FIG. 9). An example of such a continuous function is provided above as equation (1).

With continued reference to FIG. 10, perception system 402 initializes an orientation interval index int (block 1002). In an example, perception system 402 utilizes orientation interval index int as an index for the bounding box orientation intervals 622 represented in table 618.

With continued reference to FIG. 10, perception system 402 computes a derivative with respect to θ of the continuous function $f(\theta)$ for that orientation interval (block 1004), sets the derivative that was computed at block 1004 equal to zero (0), and solves the equation to determine the value of orientation θ that corresponds to the minimum value of $f(\theta)$ within this interval int (block 1006).

With continued reference to FIG. 10, perception system 402 stores the value of θ determined at block 1006, which corresponds to the local minimum of $f(\theta)$ within this bounding box orientation interval, in memory, such as memory 306 (block 1008). In an example, perception system 402 stores the local minimum orientation (e.g., $\theta_{LM1}$) as an entry 636 in a table such as table 630 shown in FIG. 6G.

With continued reference to FIG. 10, perception system 402 determines whether any additional orientation interval remains to be processed to determine its local minimum of $f(\theta)$ (block 1010). In an example, perception system 402 makes the determination at block 101 by comparing the present value of orientation interval index int to a threshold value (e.g., corresponding to the total number of intervals having entries stored in table 630).

With continued reference to FIG. 10, if perception system 402 determines that an additional orientation interval remains to be processed to determine its local minimum of $f(\theta)$ ("Yes" at block 1010), perception system 402 increments the orientation interval index int (block 1012).

With continued reference to FIG. 10, perception system 402 retrieves (block 1014) the continuous function $f(\theta)$ for the interval corresponding to the value of int that was incremented at block 1012, and passes control to block 1004 to repeat the processes described above for blocks 1004, 1006, 1008, and/or 1010 to determine the orientation value θ corresponding to the local minimum value of $f(\theta)$ for this interval.

With continued reference to FIG. 10, if perception system 402 determines that no additional orientation interval remains to be processed to determine its local minimum of $f(\theta)$ ("No" at block 1010), process 1000 ends.

Figure 11:
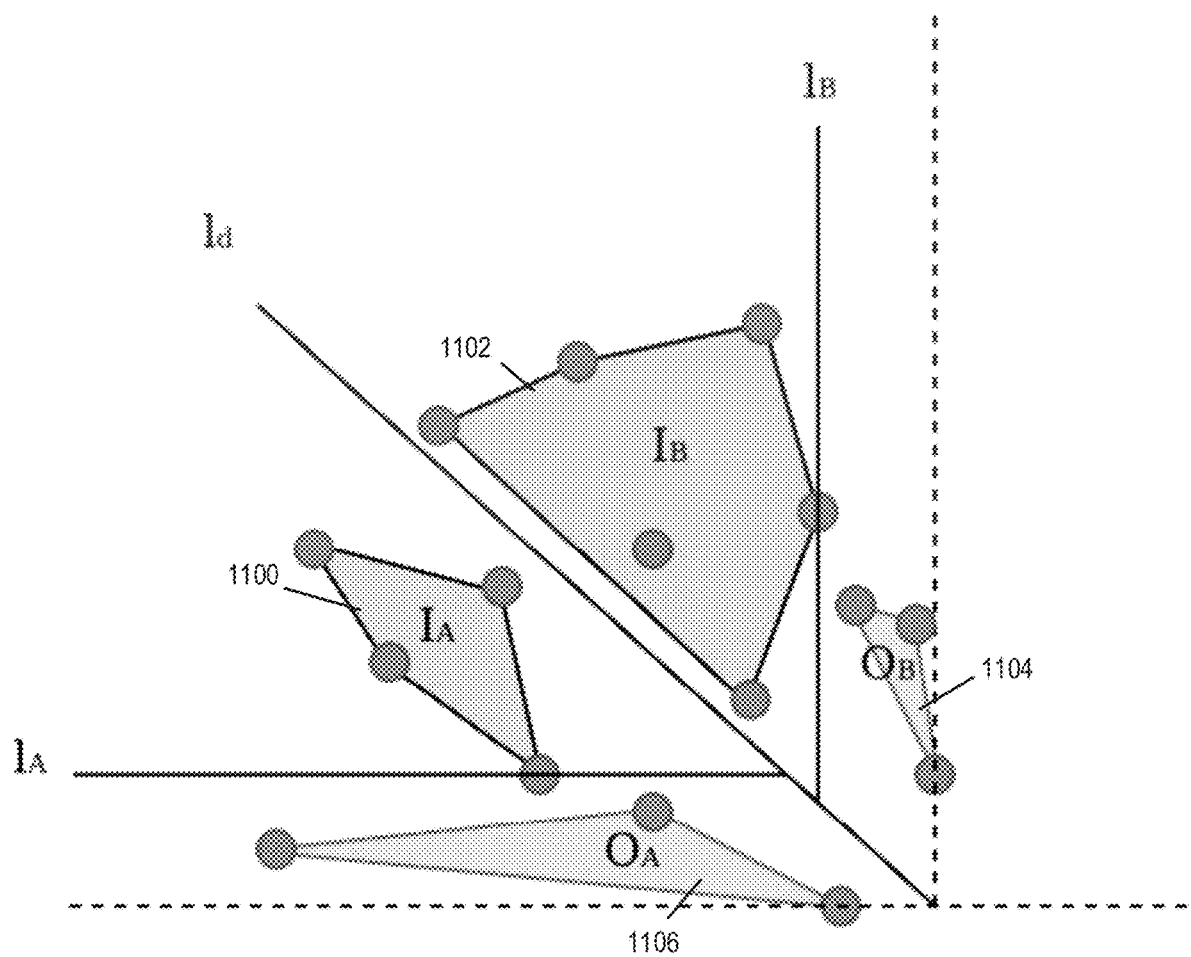
FIG. 11 conceptually illustrates exemplary rejection of outlying data points.

Sensors that generate data points 604 may inadvertently detect other objects, or may generate inaccurate or otherwise unwanted data. Embodiments of the disclosure may thus also provide methods and processes for rejection of outlying data points. FIG. 11 illustrates one such exemplary process. Any manner of outlier rejection is contemplated. In some embodiments, data point sets 1100 and 1102 may be employed to determine convex hulls, tangents thereto, bounding box orientation intervals, and optimized orientations as described herein. Additionally, outlying data point sets 1104, 1106 that do not contribute to the cost function $f(\theta)$, e.g., do not change a determined minimum distance, or that only contribute below some threshold, may be rejected prior to determination of convex hull tangents. For example, discrete or isolated sets of points 1104, 1106 may be identified as being spatially separate from point sets 1100, 1102, and their cost functions may be determined. When such cost functions fall below a predetermined threshold value, such as the case of sufficiently small point clusters, the point sets 1104, 1106 may be neglected in the bounding box calculation processes described herein. In this manner, points that may be erroneously considered as corresponding to a vehicle, such as vehicle exhaust clouds and the like, may be disregarded in determining proper bounding boxes.

Various additional example embodiments of the disclosure can be described by the following clauses:

Clause 1. A device comprising:
at least one processor; and
at least one memory storing instructions which, when executed by the at least one processor, cause the at least one processor to:

generate a bounding box enclosing a cluster of points corresponding to at least one portion of a detected vehicle, the bounding box comprising a first side and a second side;

sort the points into a first set of points located within a distance from the first side and a second set of points located within the distance from the second side;

generate a first convex hull based on the first set of points and a second convex hull based on the second set of points;

determine a plurality of intervals of orientations associated with the bounding box within which the first and second sets of points remain constant based on a portion of the first convex hull and a portion of the second convex hull;

determine an orientation of the bounding box based on the plurality of intervals of orientations that are associated with the bounding box, the orientation of the bounding box minimizing distances from each point of the first set of points to the first side and distances from each point of the second set of points to the second side; and provide data associated with the orientation of the bounding box to control circuitry of an autonomous vehicle, the data associated with the orientation configured to cause the control circuitry to control operation of the autonomous vehicle.

Clause 2. The device of Clause 1, wherein the instructions, when executed by the at least one processor, further cause the at least one processor to:

determine the plurality of intervals of orientations associated with the bounding box within which the first and second sets of points remain constant based on determining transition orientations associated with the bounding box, the transition orientations corresponding to transitions of at least one of the points from a state nearer the first side of the bounding box to a state nearer the second side of the bounding box.

Clause 3. The device of Clause 2, wherein the instructions, when executed by the at least one processor, further cause the at least one processor to:

determine the transition orientations based on determining orientations of lines tangent to at least one portion of the first convex hull or the second convex hull.

Clause 4. The device of Clause 2 or Clause 3, wherein the instructions, when executed by the at least one processor, further cause the at least one processor to:

for each of the plurality of intervals of orientations associated with the bounding box, re-sort the points into a re-sorted first set of points and a re-sorted second set of points, thereby generating re-sorted sets of points corresponding to the intervals of orientations associated with the bounding box.

Clause 5. The device of Clause 4, wherein the instructions, when executed by the at least one processor, further cause the at least one processor to:

for each of the plurality of intervals of orientations associated with the bounding box, generate at least one continuous function based on the corresponding re-sorted set of points.

Clause 6. The device of Clause 4 or Clause 5, wherein the instructions, when executed by the at least one processor, further cause the at least one processor to:

for each of the plurality of intervals of orientations associated with the bounding box, determine a locally minimizing orientation associated with the bounding box, the locally minimizing orientation associated with the bounding box locally minimizing, within the interval of orientations associated with the bounding box, distances from each point of the re-sorted first set of points to the first side and distances from each point of the re-sorted second set of points to the second side.

Clause 7. The device of Clause 6, wherein the instructions, when executed by the at least one processor, further cause the at least one processor to:
determine the orientation of the bounding box based on the plurality of intervals of orientations that are associated with the bounding box, the orientation of the bounding box minimizing distances from each point of the first set of points to the first side and distances from each point of the second set of points to the second side based on selecting, from among the locally minimizing orientations of the bounding box, an orientation corresponding to the smallest distances.

Clause 8. The device of any one of Clauses 2 through 7, wherein the instructions, when executed by the at least one processor, further cause the at least one processor to:
store in the at least one memory at least one of the plurality of intervals of orientations or the transition orientations; and
determine the orientation of the bounding box based on the plurality of intervals of orientations that are associated with the bounding box, the orientation of the bounding box minimizing distances from each point of the first set of points to the first side and distances from each point of the second set of points to the second side based on accessing the stored at least one of the intervals of orientations or the transition orientations.

Clause 9. The device of any one of Clauses 1 through 8, wherein the cluster of points corresponding to at least one portion of the detected vehicle comprises at least one of Light Detection And Ranging (LiDAR) measurements, Radio Detection and Ranging (Radar) measurements, location values determined from at least one image, or ultrasound measurements.

Clause 10. The device of any one of Clauses 1 through 9, wherein the cluster of points corresponding to at least one portion of the detected vehicle comprises two-dimensional coordinates relative to a reference point associated with the autonomous vehicle, and wherein the determined orientation of the bounding box comprises an angle relative to a coordinate frame associated with the autonomous vehicle.

Clause 11. A method comprising:
receiving, with at least one processor, a plurality of location values of detected portions of an object;
determining, with the at least one processor, a first convex hull of a first set of the location values nearest a first side of a bounding enclosure, and a second convex hull of a second set of the location values nearest a second side of the bounding enclosure;
determining, with the at least one processor, based on at least a portion of the first and second convex hulls, intervals of orientations of the bounding enclosure within which each location value remains nearest a same one of the sides of the bounding enclosure;
computing, with the at least one processor, from the intervals, an orientation of the bounding enclosure corresponding to a minimum distance between the edges of the bounding enclosure and the location values; and
outputting, with the at least one processor, the determined orientation of the bounding box to control circuitry of a vehicle.

Clause 12. The method of Clause 11, further comprising determining the intervals of orientations according to orientations of the bounding enclosure that correspond to a transition of one location value from a state nearest one edge of the bounding enclosure to a state nearest another edge of the bounding enclosure.

Clause 13. The method of Clause 12, wherein the computing further comprises:
selecting, from within each interval of orientations, that orientation corresponding to the minimum distance between the edges of the corresponding bounding enclosure and the nearest location values, so as to form a set of minimum distance orientations; and
selecting, from among the set of minimum distance orientations, the orientation corresponding to the smallest minimum distance.

Clause 14. The method of Clause 13, wherein the selecting those orientations corresponding to the minimum distances further comprises selecting those orientations according to at least one continuous function.

Clause 15. The method of any one of Clauses 12 through 14, further comprising storing the intervals of orientations in at least one of the memories.

Clause 16. The method of any one of Clauses 11 through 15, further comprising determining the intervals of orientations at least in part according to ones of the orientations having sides tangent to pairs of the convex hulls.

Clause 17. The method of any one of Clauses 11 through 16, wherein the location values comprise at least one of Light Detection And Ranging (LiDAR) measurements, Radio Detection and Ranging (Radar) measurements, location values determined from at least one image, or ultrasound measurements.

Clause 18. The method of any one of Clauses 11 through 17, wherein the object comprises at least one of a vehicle, a pedestrian, a portion of a roadway, or a roadside object.

Clause 19. The method of any one of Clauses 11 through 18, further comprising rejecting ones of the location values that do not change the minimum distance, and determining the intervals of orientations of the bounding enclosure at least in part according to ones of the location values that were not rejected.

Clause 20. The method of any one of Clauses 11 through 19, wherein the bounding enclosure is a bounding box.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A device comprising:
at least one processor; and
at least one memory storing instructions which, when executed by the at least one processor, cause the at least one processor to:

generate a bounding box enclosing a cluster of points corresponding to at least one portion of a detected vehicle, the bounding box comprising a first side and a second side;
sort the cluster of points into a first set of points located within a distance from the first side and a second set of points located within the distance from the second side;
generate a first convex hull based on the first set of points and a second convex hull based on the second set of points;
determine a plurality of intervals of orientations associated with the bounding box within which the first set of points and the second set of points remain constant based on a portion of the first convex hull and a portion of the second convex hull;
determine an orientation of the bounding box based on the plurality of intervals of orientations that are associated with the bounding box, the orientation of the bounding box minimizing distances from each point of the first set of points to the first side and distances from each point of the second set of points to the second side; and
provide data associated with the orientation of the bounding box to control circuitry of an autonomous vehicle, the data associated with the orientation configured to cause the control circuitry to control operation of the autonomous vehicle.

2. The device of claim 1, wherein the instructions, when executed by the at least one processor, further cause the at least one processor to:
determine the plurality of intervals of orientations associated with the bounding box within which the first set of points and the second set of points remain constant based on determining transition orientations associated with the bounding box, the transition orientations corresponding to transitions of at least one point of the cluster of points from a state nearer the first side of the bounding box to a state nearer the second side of the bounding box.

3. The device of claim 2, wherein the instructions, when executed by the at least one processor, further cause the at least one processor to:
determine the transition orientations based on determining orientations of lines tangent to at least one portion of the first convex hull or the second convex hull.

4. The device of claim 2, wherein the instructions, when executed by the at least one processor, further cause the at least one processor to:
for each of the plurality of intervals of orientations associated with the bounding box, re-sort the cluster of points into a re-sorted first set of points and a re-sorted second set of points, thereby generating re-sorted sets of points corresponding to the plurality of intervals of orientations associated with the bounding box.

5. The device of claim 4, wherein the instructions, when executed by the at least one processor, further cause the at least one processor to:
for each of the plurality of intervals of orientations associated with the bounding box, generate at least one continuous function based on a corresponding re-sorted set of points.

6. The device of claim 4, wherein the instructions, when executed by the at least one processor, further cause the at least one processor to:
for each of the plurality of intervals of orientations associated with the bounding box, determine a locally minimizing orientation associated with the bounding box, the locally minimizing orientation associated with the bounding box locally minimizing, within the interval of orientations associated with the bounding box, distances from each point of the re-sorted first set of points to the first side and distances from each point of the re-sorted second set of points to the second side.

7. The device of claim 6, wherein the instructions, when executed by the at least one processor, further cause the at least one processor to:
determine the orientation of the bounding box based on the plurality of intervals of orientations that are associated with the bounding box, the orientation of the bounding box minimizing distances from each point of the first set of points to the first side and distances from each point of the second set of points to the second side based on selecting, from among the locally minimizing orientations associated with the bounding box, an orientation corresponding to smallest distances.

8. The device of claim 2, wherein the instructions, when executed by the at least one processor, further cause the at least one processor to:
store in the at least one memory at least one of the plurality of intervals of orientations or the transition orientations; and
determine the orientation of the bounding box based on the plurality of intervals of orientations that are associated with the bounding box, the orientation of the bounding box minimizing distances from each point of the first set of points to the first side and distances from each point of the second set of points to the second side based on accessing the stored at least one of the plurality of intervals of orientations or the transition orientations.

9. The device of claim 1, wherein the cluster of points corresponding to at least one portion of the detected vehicle comprises at least one of Light Detection And Ranging (LiDAR) measurements, Radio Detection and Ranging (Radar) measurements, location values determined from at least one image, or ultrasound measurements.

10. The device of claim 1, wherein the cluster of points corresponding to at least one portion of the detected vehicle comprises two-dimensional coordinates relative to a reference point associated with the autonomous vehicle, and wherein the determined orientation of the bounding box comprises an angle relative to a coordinate frame associated with the autonomous vehicle.

11. A method comprising:
receiving, with at least one processor, a plurality of location values of detected portions of an object;
determining, with the at least one processor, a first convex hull of a first set of the plurality of location values nearest a first side of a bounding enclosure, and a second convex hull of a second set of the plurality of location values nearest a second side of the bounding enclosure;
determining, with the at least one processor, based on at least a portion of the first convex hull and the second convex hull, intervals of orientations of the bounding enclosure within which each location value remains nearest a same side of the bounding enclosure;
computing, with the at least one processor, from the intervals, an orientation of the bounding enclosure corresponding to a minimum distance between edges of the bounding enclosure and the plurality of location values; and outputting, with the at least one processor, the computed orientation of the bounding enclosure to control circuitry of a vehicle.

12. The method of claim 11, further comprising determining the intervals of orientations according to orientations of the bounding enclosure that correspond to a transition of one location value from a state nearest one edge of the bounding enclosure to a state nearest another edge of the bounding enclosure.

13. The method of claim 12, wherein computing the orientation of the bounding enclosure further comprises:
   selecting, from within each interval of orientations, an orientation corresponding to the minimum distance between the edges of the bounding enclosure and nearest location values, so as to form a set of minimum distance orientations; and
   selecting, from among the set of minimum distance orientations, an orientation corresponding to the a smallest minimum distance.

14. The method of claim 13, wherein selecting the orientations corresponding to the minimum distances further comprises selecting the orientations according to at least one continuous function.

15. The method of claim 12, further comprising storing the intervals of orientations in at least one memory.

16. The method of claim 11, further comprising determining the intervals of orientations at least in part according to orientations of the intervals of orientations having sides tangent to pairs of convex hulls.

17. The method of claim 11, wherein the plurality of location values comprise at least one of Light Detection And Ranging (LiDAR) measurements, Radio Detection and Ranging (Radar) measurements, location values determined from at least one image, or ultrasound measurements.

18. The method of claim 11, wherein the object comprises at least one of a vehicle, a pedestrian, a portion of a roadway, or a roadside object.

19. The method of claim 11, further comprising rejecting location values of the plurality of location values that do not change the minimum distance, and determining the intervals of orientations of the bounding enclosure at least in part according to location values of the plurality of location values that were not rejected.

20. The method of claim 11, wherein the bounding enclosure is a bounding box.

* * * * *